United States Patent
Lee (10) Patent No.: US 9,370,987 B2
(45) Date of Patent: Jun. 21, 2016

(54) ROTATABLE SUN VISOR MIRROR OF VEHICLE

(71) Applicant: Hyundai Motor Company, Seoul (KR)

(72) Inventor: Jae Yong Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/548,186

(22) Filed: Nov. 19, 2014

(65) Prior Publication Data

US 2015/0258877 A1    Sep. 17, 2015

(30) Foreign Application Priority Data

Mar. 17, 2014   (KR) ........................ 10-2014-0030712

(51) Int. Cl.
*G02B 5/08* (2006.01)
*B60J 3/02* (2006.01)

(52) U.S. Cl.
CPC ..................................... *B60J 3/0282* (2013.01)

(58) Field of Classification Search
CPC ............ B60J 3/0282; B60J 3/02; B60J 3/026; B60J 3/0208; B60J 3/0204; B60J 3/0239; B60J 3/0265
USPC ......... 359/844, 872, 876, 881; 296/1.11, 97.5
See application file for complete search history.

(56) References Cited

U.S. PATENT DOCUMENTS

| 6,669,859 B1 * | 12/2003 | Tiesler .................. B60J 3/0282 16/297 |
| 2013/0016429 A1 * | 1/2013 | Li .......................... B60R 1/008 296/97.5 |

FOREIGN PATENT DOCUMENTS

| JP | 02-064421 U | 3/1990 |
| JP | 02-078411 U | 3/1990 |
| JP | 2-175340 A | 7/1990 |
| JP | 2005-153854 A | 6/2005 |
| KR | 1997-0034948 A | 7/1997 |
| KR | 1997-0034949 A | 7/1997 |

* cited by examiner

*Primary Examiner* — Euncha Cherry
(74) *Attorney, Agent, or Firm* — Morgan, Lewis & Bockius LLP

(57) ABSTRACT

A sun visor mirror may include a mirror housing fixed to a sun visor main body, a mirror inserted into and seated on the mirror housing, a locking mechanism including a locker and an operating spring, locking the mirror in a state being inserted into and seated on the mirror housing and releasing the mirror by a user manipulation, and an operating unit provided between the mirror housing and the mirror, having an elastic member, operating the mirror popping-up out of the mirror housing due to an elastic force of the elastic member and rotating at a released state.

13 Claims, 9 Drawing Sheets

In the transversal direction

Popups and rotates mirror

In the transversal direction

FIG. 3A

Popups and rotates mirror

FIG. 3B

In the longitudinal direction

Fixing section (rotation by 90°)

FIG. 8C

Rotation section (rotation by 60°)

ROTATABLE SUN VISOR MIRROR OF VEHICLE

CROSS-REFERENCE TO RELATED APPLICATION

The present application claims priority to Korean Patent Application No. 10-2014-0030712 filed Mar. 17, 2014, the entire contents of which is incorporated herein for all purposes by this reference.

BACKGROUND OF THE INVENTION

1. Field of the Invention

The present invention relates to a sun visor mirror of a vehicle. More particularly, it relates to a sun visor mirror in which a mirror is automatically rotated within a sun visor by a simple driving mechanism.

2. Description of Related Art

In general, a sun visor is installed in the compartments of a vehicle to block direct rays of the sun and to promote safe driving and conveniences.

A sun visor is mounted on a roof panel near a driver's seat or a front passenger's seat such that a main body is installed to rotate about a pivot arm to block direct rays of the sun through a windshield glass or a door glass.

Moreover, a mirror as one of convenient devices for a driver or a passenger is attached to a front side of the main body of the sun visor, while a cover may be installed to cover the mirror when the mirror on the front side is not used.

Figure 1:
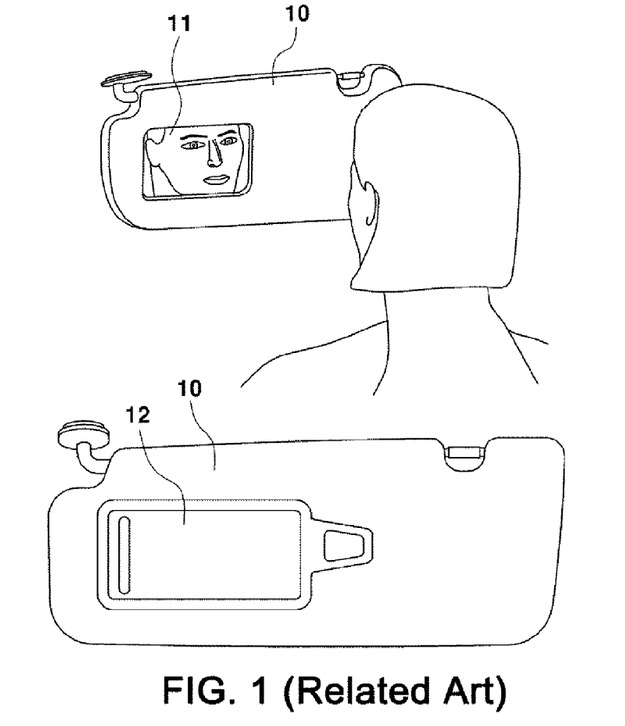
FIG. 1 is a view illustrating an existing sun visor.

FIG. 1 is a view showing a sun visor including a main body 10, a mirror 11 attached to the front side of the main body 10, and a cover covering the mirror 11, wherein the cover 12 is slid and the mirror 11 is exposed and ready to use.

Meanwhile, female drivers may use the mirror more frequently and prefer a big mirror reflecting their whole faces.

However, since the size of the sun visor is fixed due to a package layout of a vehicle, the mirror is also fixed in size. Further, since the mirror should be installed transversely due to shape of the sun visor, height of the mirror should be limited.

Moreover, since height of the sun visor is determined according to the package layout, it is impossible to increase the height of the mirror as high as necessary. Since whole face of a user is not reflected by the mirror due to the limited height, customers, especially female customers make complaints.

In order to solve the problem, a sun visor having a rotatable mirror is suggested and the rotatable mirror is disclosed in Japanese Patent Publication No. 1990-175340 (Jul. 6, 1990; Patent Document 1), Korean Patent Publication No. 1997-0034948 (Jul. 22, 1997; Patent Document 2), Korean Patent Publication No. 1997-0034949 (Jul. 22, 1997; Patent Document 3), and Japanese Patent Publication No. 2005-153854 (Jun. 16, 2005; Patent Document 4).

The above-mentioned patent documents disclose a mirror of a sun visor rotatable horizontally and vertically, wherein height of the mirror may be increased when the mirror is rotated vertically (rotated vertically long) then whole parts of a face can be reflected by the mirror.

However, the existing sun visor mirror should include a complicated mechanism such as a gearbox for the rotation (Patent Document 1), be a manual system in which a user directly rotates the mirror with his/her hands (Patent Documents 2 and 4), and include a separated power transmitting device for the rotation of the mirror such as a solenoid plunger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sun visor mirror in which a mirror is rotated on a main body of a sun visor by a simple mechanism not manually but automatically.

According to various aspects of the present invention, a rotatable sun visor mirror of a vehicle may include a mirror housing fixed to a sun visor main body, a mirror inserted into and seated on the mirror housing, a locking mechanism including a locker and an operating spring, locking the mirror in a state being inserted into and seated on the mirror housing and releasing the mirror by a user manipulation, and an operating unit provided between the mirror housing and the mirror, having an elastic member, operating the mirror popping-up out of the mirror housing due to an elastic force of the elastic member and rotating at a released state.

The operating unit may include a support formed on the mirror housing, a coupler formed on the mirror and coupled to the support, a guide unit formed in the support and the coupler to guide the coupler on the support in a popping-up direction and a rotation direction, and an elastic member installed between the support and the coupler to apply an elastic force to the coupler for the popping-up and the rotating of the mirror.

The support may protrude from an inner surface of the mirror housing where the mirror is inserted and seated in the form of a cylinder, the coupler may protrude from a rear side of the mirror in a cylindrical shape, and the elastic member may apply an elastic force to the support from inside of the coupler to outside of the coupler.

The elastic member may be a coil spring positioned inside the coupler and installed between the support and the coupler.

The coil spring may be installed with an end thereof supported on an inner bottom of the support and another end supported on an inner bottom of the coupler so that the support supports the coupler elastically and fixing protrusions inserted into the coil spring may fix the coil spring on the inner bottom of the support and the inner bottom of the coupler.

The guide unit may include a guide slot penetrating a lateral side of the support first in a curve shape and a guide protrusion protruding from the coupler coupled to an inner side of the support and guided along the guide slot in a state of being inserted into the guide slot.

The guide slot may be formed on both lateral sides of the support and the guide protrusion may be formed on both sides of the coupler.

The guide slot may include a pop-up section formed from an end portion of the support adjacent to the mirror housing in the axial direction, and a rotation section connected to the popup section and formed obliquely toward an opposite end portion of the support.

The guide slot may further include a fixing section connected to the rotation section and formed long from the opposite end portion of the support in the axial direction.

The locking mechanism may include the locker movably installed in the mirror housing and coupled with the mirror to fix a movement of the mirror in a locking direction, and the operating spring elastically supporting the locker in the mirror housing and elastically moving the locker in the locking direction.

The locker may be movably installed to a mounting unit protruding from a lateral end of the mirror housing and have a leading end penetrating a through-hole of a lateral side of the mirror housing and may be inserted into a coupling recess formed in the mirror at the movement of the mirror in the locking direction.

The locker may include a manipulation unit formed at a side thereof, penetrating a manipulation hole formed in the mounting unit of the mirror housing, and positioned on an outer surface of the mirror housing.

Therefore, the sun visor mirror of a vehicle according to the present invention is configured such that a mirror is automatically popped-up and rotated by a simple manipulation, resulting in improvement of convenient use and manipulation, promotion of maximized use, and solving lack of height of the mirror by rotating the mirror.

Moreover, since the sun visor mirror according to the present invention includes a simple mechanism and configuration to pop-up and rotate the mirror, several drawbacks of the existing rotatable mirror such as excessive number of parts and bad appearance of the mirror after the rotation can be overcome and manufacturing costs and weight can be reduced.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention is directed to providing a sun visor mirror in which a mirror is rotated on a main body of a sun visor by a simple mechanism not manually but automatically.

To this end, the sun visor mirror according to an embodiment of the present invention employs a mechanism automatically popping-up and rotating a mirror using an elastic force of a spring.

Figure 2:
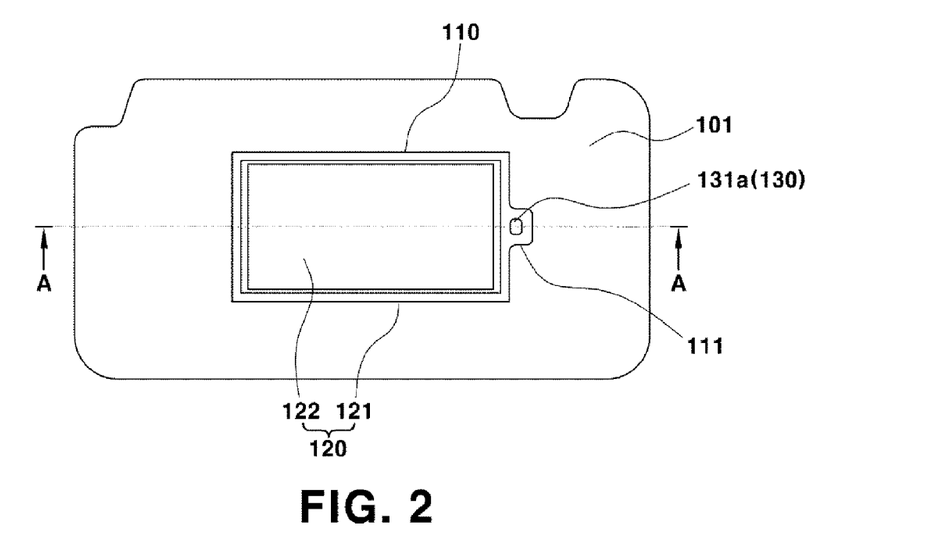
FIG. 2 is a front view illustrating a sun visor to which an exemplary sun visor mirror according to the present invention is mounted.
Figure 3A:
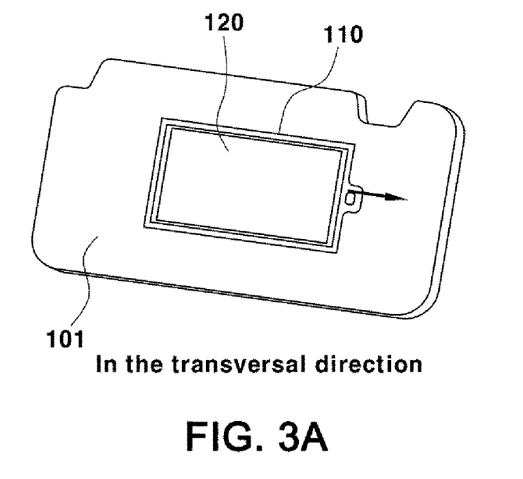
FIG. 3A, FIG. 3B and FIG. 3C are views illustrating operations of the exemplary sun visor mirror according to the present invention.
Figure 3B:
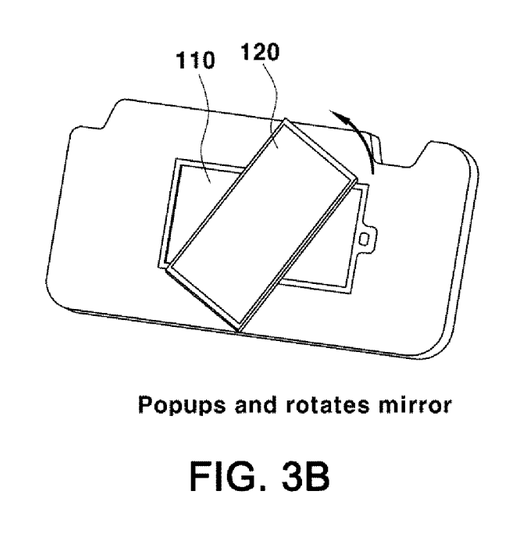
Figure 3C:
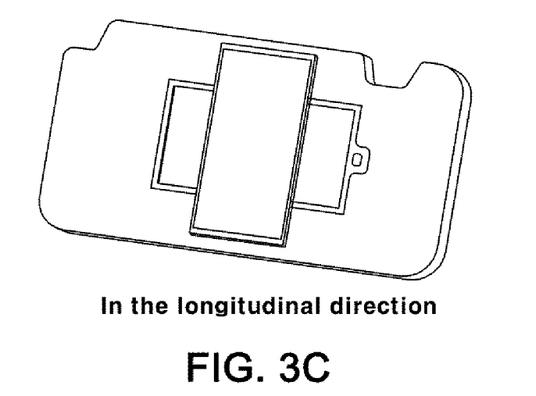
Figure 4A:
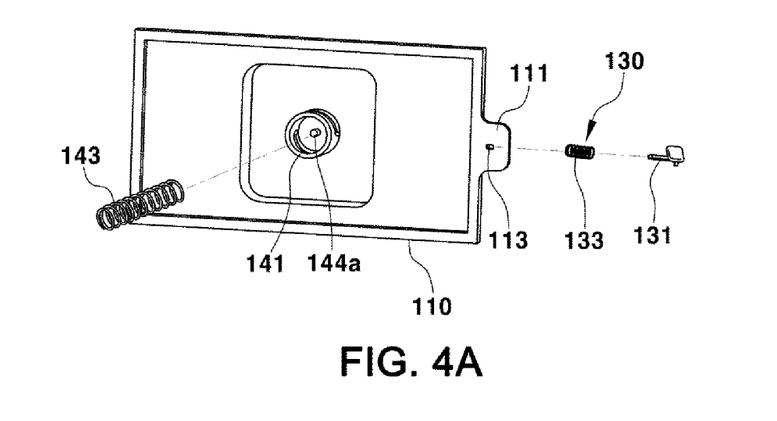
FIG. 4A and FIG. 4B are exploded perspective views illustrating the exemplary sun visor mirror according to the present invention.
Figure 4B:
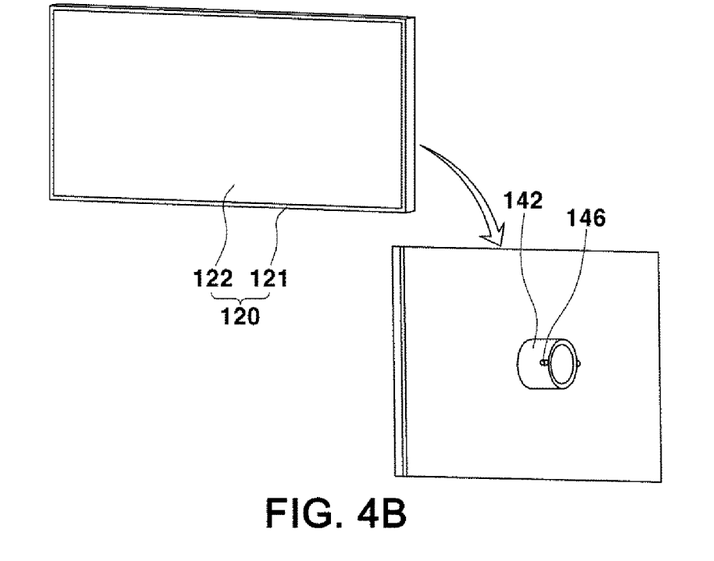

FIG. 2 is a front view illustrating a sun visor mounted with a mirror according to various embodiments of the present invention, FIGS. 3A-3C are views illustrating operations of the mirror according to various embodiments of the present invention, and FIGS. 4A and 4B are exploded perspective views of the mirror according to various embodiments of the present invention.

As illustrated, the sun visor mirror according to various embodiments of the present invention includes a mirror housing 110 fixed to a sun visor main body 101, a mirror 120 made by assembling mirror glass 122 and a mirror case 121, a locking mechanism 130 locking the mirror 120 while the mirror 120 is inserted into and seated in the mirror housing 110 and releasing the mirror 120 while the mirror 120 is used by a user, and an operating unit 140 pop-upping and rotating the mirror 120 on the mirror housing using the elastic force of an elastic member 143 when being released by the locking mechanism 130.

Here, the pop-upping means operation in which the mirror 120 protrudes from a front side of the sun visor main body 101 toward a user for the rotation.

In the sun visor mirror according to various embodiments of the present invention, the mirror 120 is inserted into and seated in the mirror housing 110 transversely (horizontally) (See FIG. 3A). This position of the mirror is called an 'initial position', and is popped-up and rotated by the elastic force of the spring when the locked state is released by the locking mechanism 130, resulting in placing the mirror in the longitudinal direction (vertically) (See FIG. 3C). This position of the mirror is called an 'operated position'.

At this time, the mirror 120 rotates by about 90 degrees from the initial position and is positioned at the operated position.

With reference to FIGS. 4A, 4B and FIGS. 5-7, the operating unit 140 includes a support 141 provided in the mirror housing 110, a coupler 142 provided in the mirror 120 and coupled with the coupler 141, a guide unit provided in the support 141 and the coupler 142 to guide the coupler 142 in a popping-up direction and a rotation direction on the support 141, an elastic member 143 installed between the support 141 and the coupler 142 to apply an elastic force to the coupler 142 for the popping-up and the rotation.

Figure 5:
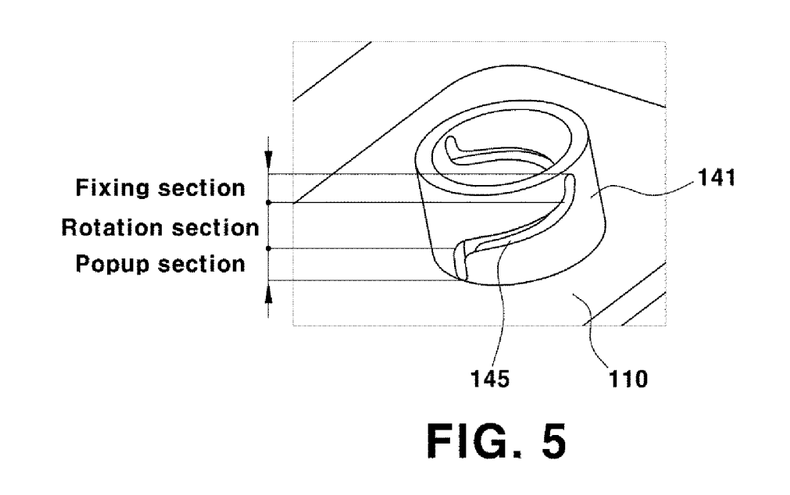
FIG. 5 is a perspective view illustrating a support provided in a mirror housing of the exemplary sun visor mirror according to the present invention.

The support 141 cylindrically protrudes from the inner central portion of the mirror housing 110 where the mirror 120 is inserted into and seated on and the coupler 142 is inserted thereinto for the coupling.

Figure 6:
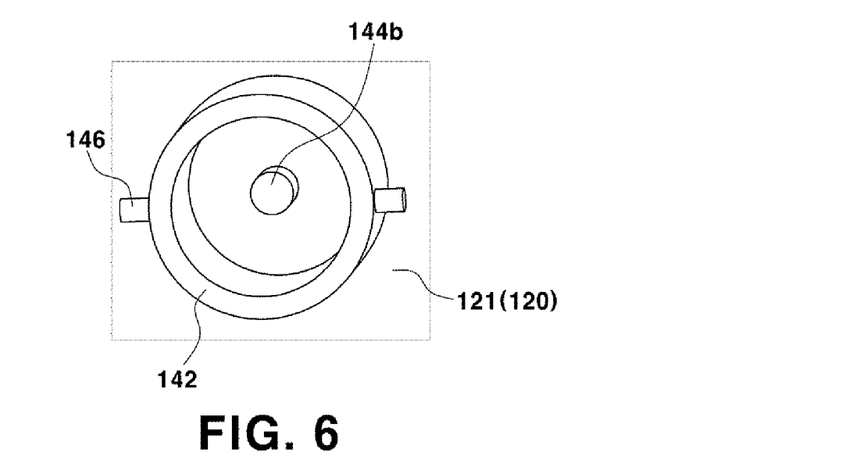
FIG. 6 is a perspective view illustrating a coupler unit provided in a mirror case of the exemplary sun visor mirror according to the present invention.

The coupler 142 cylindrically protrudes from the rear central portion of the mirror 120, specifically from the rear central portion of the mirror case 121 with which the mirror glass 122 is coupled and is inserted into the support 141 of the mirror housing 110.

Figure 7:
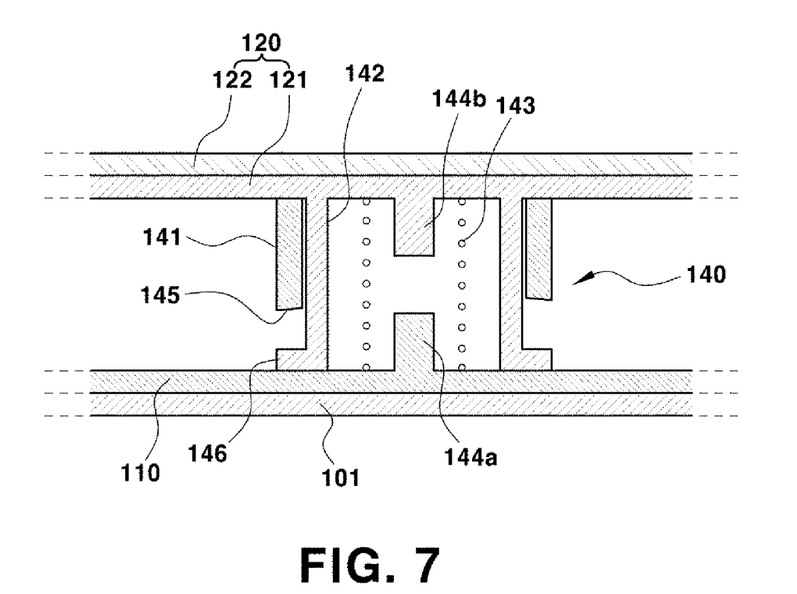
FIG. 7 is a sectional view illustrating an assembly of an operating unit of the exemplary sun visor mirror according to the present invention and taken along the ling A-A of FIG. 2.
Figure 8A:
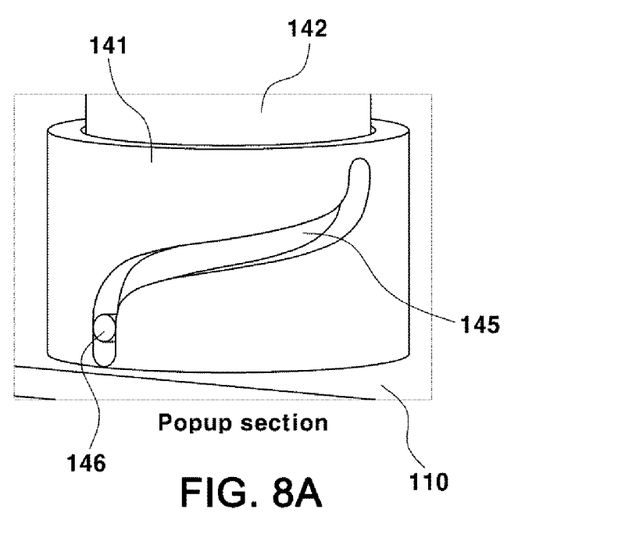
FIG. 8A, FIG. 8B, FIG. 8C and FIG. 8D are views illustrating movement of a guide protrusion along a guide slot during the popup and rotation of a mirror of the exemplary sun visor mirror according to the present invention.
Figure 8B:
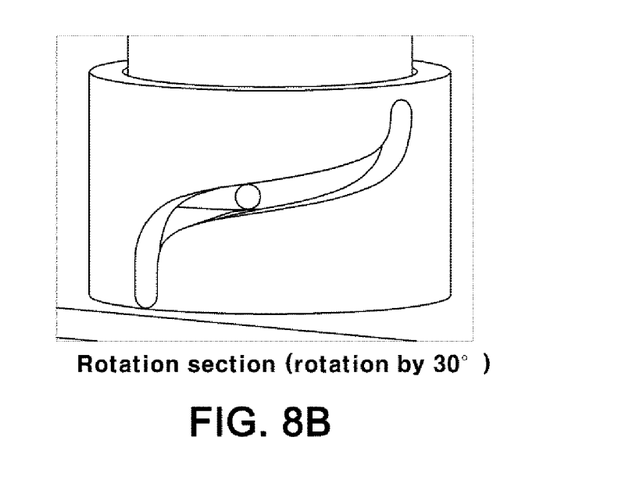
Figure 8C:
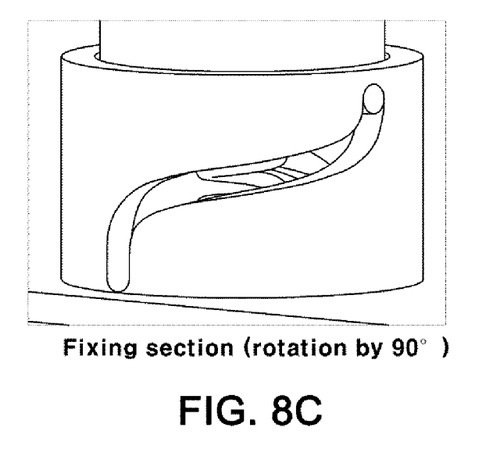
Figure 8D:
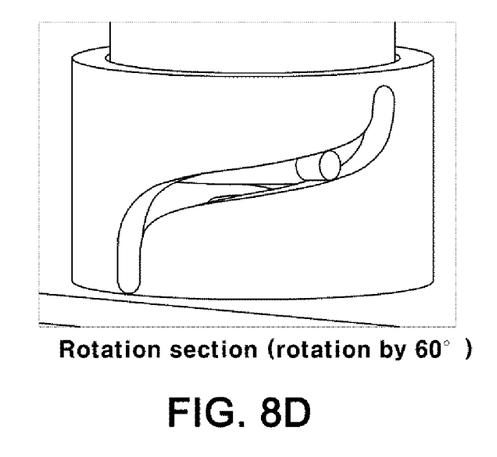

The elastic member 143 may be a coil spring positioned inside the coupler 142 and mounted between the support 141 and the coupler 142, while the coil spring 143 provides an elastic force to push the support 141 from the coupler 142 outwardly.

In this case, the coil spring 143 is installed such that one end is supported by the inner bottom of the support 141 and the other end is supported by the inner bottom of the coupler 142 to support the coupler 142 elastically on the support 141.

According to various embodiments of the present invention, fixed protrusions 144a and 144b are formed on the inner bottom of the support 141 and the inner bottom of the coupler 142 and are inserted into the coil spring 143 such that the respective fixed protrusions 144a and 144b fix the coil spring 143 on the support 141 and the coupler 142 without movement.

When the coil spring is installed such that the respective protrusions 144a and 144b are inserted into inside the ends of the coil spring 143, the lateral movement of the coil spring 143 may be prevented when the mirror 120 moves and stable operations of the coil spring 143 and the mirror 120 may be achieved.

Due to this configuration, in the state that the mirror 120 is inserted into and sits in the mirror housing 110 (at the initial position of the mirror), the coil spring 143 is compressed. When the state is changed such that the locked state of the locking mechanism 130 is released and the mirror 120 may be pop-upped and rotated, the elastic force of the coil spring 143 is applied to the mirror 120 via the coupler 142 and pushes the mirror 120 outside the mirror housing 110.

When the elastic force of the coil spring 143 is applied, it is the guide unit that guides the mirror 120 in the pop-upping direction and the rotation direction through the support 141 and the coupler 142.

The guide unit includes guide slots 145 each of which is formed on both lateral sides of the support 141 in a curved shape and guide protrusions 146 protruding from both outer lateral sides of the coupler 142 and guided by the guide slots 145 while being inserted into the respective corresponding guide slots 145.

The guide slots 145 penetrate the lateral walls of the cylindrical support 141 and as illustrated in FIGS. 5 and 8A-8D, may have a pop-up section formed from an end portion of the support 141 adjacent to the surface of the mirror housing 110 as long as a preset in the axial direction, a rotation section connected to the popup section and formed from the lateral wall of the support 141 to the opposite end of the support obliquely, and a fixing section connected to the rotation section and formed from the opposite end of the support 141 as long as a preset length in the axial direction.

In this case, the popup section, the rotation section, and the fixing section are connected to each other in the curved shape such that the guide protrusions 146 are smoothly guided at the connection portions and passed therethrough.

In the state that the mirror 120 is inserted into the mirror housing 110, for the rotation of the mirror, protrusion of the mirror 120 out of the mirror housing 110, that is, a primary popup operation should be performed and after that the mirror 120 should rotate.

Thus, the popup section is to guide the coupler 142 such that the primary popup of the mirror 120 may be carried out so that the mirror 120 moves out of the mirror housing without rotation and to guide the guide protrusions 146 within the guide slots 145 in the axial direction such that the coupler 142 may move in the axial direction.

Moreover, since the rotation section is to rotate the mirror 120 and is formed obliquely along the circumference from the lateral wall of the support 141 to the end portion of the support, the mirror 120 rotates and protrudes further (pop-ups) when the guide protrusions 146 pass through this section.

While the guide protrusions 146 of the coupler 142 pass through the rotation section of the guide slots 145, the mirror 120 rotates from the transverse state (horizontal state) to the longitudinal state (vertical state) by about 90 degrees.

The fixing section is to move the coupler 142 and the guide protrusions 146 further on the support in the axial direction after the rotation of the mirror 120 by 90 degrees and prevents the mirror 120 from being shaken in the rotation direction after the rotation of the mirror 120 by 90 degrees.

That is, since the guide protrusions 146 may move only in the axial direction in the fixing section, the mirror 120 moves slightly further only in the protruding direction without shaking and the rotational movement is restricted when the guide protrusions 146 enter the fixing section after the rotation by 90 degrees, resulting in prevention of the shaking of the mirror 120.

Meanwhile, the locking mechanism 130 is an element to fix the mirror 120 at the initial position within the mirror housing 110, that is, in the inserted state into the mirror housing 110 and is configured such that the locked state of the mirror may be released by a simple manipulation of a user.

When the locked state of the mirror 120 is released, the coupler 142 of the mirror moves elastically on the support 141 of the mirror housing 110 due to the elastic force of the coil spring 143 (the coil spring pushes the mirror from the mirror housing), and at this time the guide protrusions 146 move along the guide slots 145, so that the mirror 120, as illustrated in FIG. 3, is automatically pop-upped and rotated.

Figure 9:
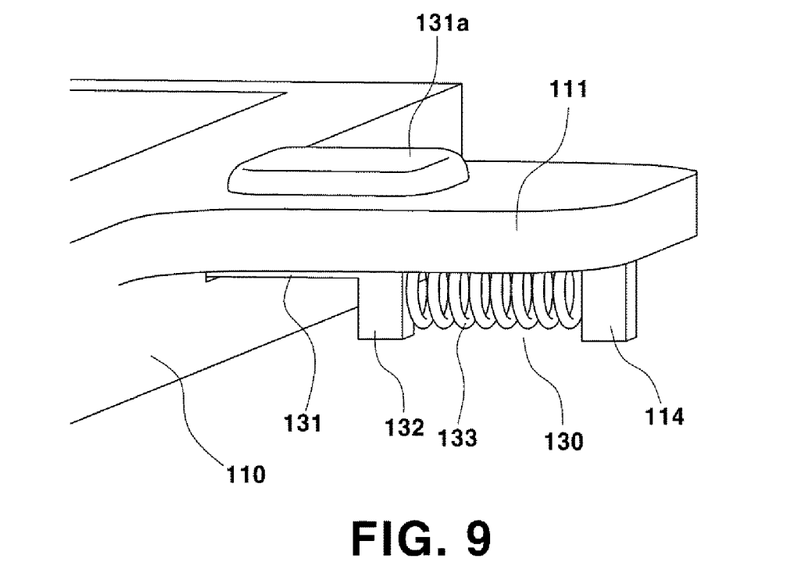
FIG. 9 is a perspective view illustrating a lock mechanism installed in the exemplary sun visor mirror according to the present invention.
Figure 10A:
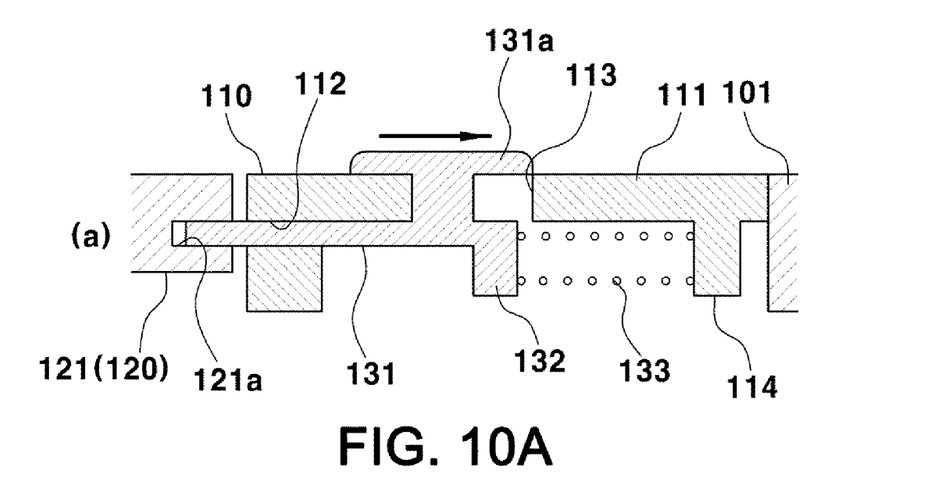
FIG. 10A and FIG. 10B are views illustrating operations of the lock mechanism of the exemplary sun visor mirror according to the present invention and taken along the line A-A of FIG. 2.
Figure 10B:
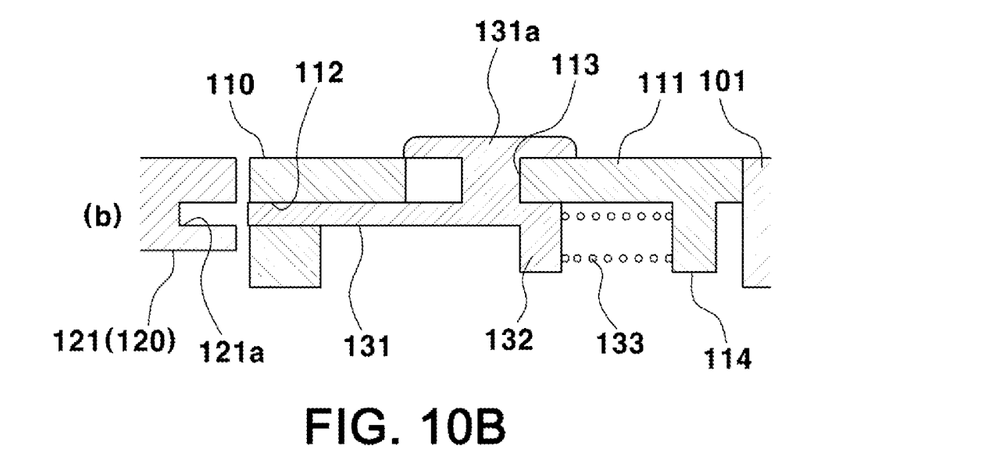

With reference to FIGS. 9, 10A and 10B, the locking mechanism 130 includes a locker 131 movably installed to the mirror housing 110 and coupled to the mirror 120 to fix the mirror when it moves in the locking direction and an operating spring 133 elastically supporting and moving the locker 131 in the locking direction in the mirror housing 110.

The locker 131 is installed to slide inside a mounting unit 111 protruding from a lateral end of the mirror housing 110 and to penetrate a through-hole 112 formed in the lateral side of the mirror housing such that a leading end protrudes inside the mirror housing at the movement in the locking direction.

The locker 131 is configured such that the leading end is inserted into and locked by a coupling recess 121a formed in the mirror 120 (the mirror case) at the forward movement in the locking direction and such that the leading end is separated from the coupling recess 121a at the backward movement in the releasing direction and then the locking is released.

Moreover, the locker has a manipulation button 131a formed at a side thereof to penetrate a manipulation hole 113 formed in the mounting unit 111 of the mirror housing 110 and to position on an outer surface of the mirror housing 110 such that a user may manipulate.

The locker 131 and the mounting unit 111 of the mirror housing 110 are formed with spring supports 114 and 132 supporting ends of the operating spring 133 and the operating spring 133, that is the coil spring is installed between the spring support 132 and the spring support 114 of the mirror housing 110.

The operating spring 133 is in a compressed state and applies an elastic force to the locker 131 in the locking direction when the locker 131 moves in the releasing direction.

FIG. 10A illustrates the locked state and FIG. 10B illustrates the released state. When a user pushes the manipulation unit 131a laterally with a hand in the locked state, that is, when a user pushes the locker 131 in the releasing direction, the operating spring is compressed and the leading end of the locker 131 is separated from the coupling recess 121a of the mirror 120 and the releasing is carried out.

On the contrary, in the state when a user pushes the manipulation unit 131a laterally with a hand as illustrated in FIG. 10B, when the mirror 120 is inserted into the mirror housing 110 and then a hand of a user is released from the manipulation unit 131a of the locker 131, the locker 131 advances due to the elastic force of the operation spring 133 such that the leading end of the locker is inserted into the coupling recess 121a, that is, the locked stated is achieved.

Moreover, when the locker 131 is moved for the released state as illustrated in FIG. 10B, the mirror 120 is pop-upped and rotated by the elastic force of the coil spring 143 installed in the operation unit 140 and is positioned vertically and a user may use the longitudinal mirror 120.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A rotatable sun visor mirror of a vehicle comprising:
a mirror housing fixed to a sun visor main body;
a mirror inserted into and seated on the mirror housing;
a locking mechanism locking the mirror in a state being inserted into and seated on the mirror housing and releasing the mirror by a user manipulation; and
an operating unit provided between the mirror housing and the mirror, having an elastic member, operating the mirror popping-up out of the mirror housing in a vertical direction due to an elastic force of the elastic member and rotating in a horizontal plane at a released state.

2. The rotatable sun visor mirror of claim 1, wherein the operating unit comprises:
a support formed on the mirror housing;
a coupler formed on the mirror and coupled to the support;
a guide unit formed in the support and the coupler to guide the coupler on the support in a popping-up direction and a rotation direction; and
an elastic member installed between the support and the coupler to apply an elastic force to the coupler for the popping-up and the rotating of the mirror.

3. The rotatable sun visor mirror of claim 2, wherein the support protrudes from an inner surface of the mirror housing, where the mirror is inserted and seated, in the form of a cylinder, the coupler protrudes from a rear side of the mirror in a cylindrical shape, and the elastic member applies an elastic force to the support from inside of the coupler to outside the coupler.

4. The rotatable sun visor mirror of claim 3, wherein the elastic member is a coil spring positioned inside the coupler and installed between the support and the coupler.

5. The rotatable sun visor mirror of claim 4, wherein the coil spring is installed with an end thereof supported on an inner bottom of the support and another end supported on an inner bottom of the coupler so that the support supports the coupler elastically and fixing protrusions inserted into the coil spring fix the coil spring on the inner bottom of the support and the inner bottom of the coupler.

6. The rotatable sun visor mirror of claim 2, wherein the guide unit comprises:
a guide slot penetrating a lateral side of the support first in a curve shape; and
a guide protrusion protruding from the coupler coupled to an inner side of the support and guided along the guide slot in a state of being inserted into the guide slot.

7. The rotatable sun visor mirror of claim 6, wherein the guide slot is formed on both lateral sides of the support and the guide protrusion is formed on both sides of the coupler.

8. The rotatable sun visor mirror of claim 6, wherein the guide slot comprises:
a pop-up section formed from an end portion of the support adjacent to the mirror housing in the axial direction; and
a rotation section connected to the popup section and formed obliquely toward an opposite end portion of the support.

9. The rotatable sun visor mirror of claim 8, wherein the guide slot further comprises a fixing section connected to the rotation section and formed long from the opposite end portion of the support in the axial direction.

10. The rotatable sun visor mirror of claim 1, wherein the locking mechanism comprises:
a locker movably installed in the mirror housing and coupled with the mirror to fix a movement of the mirror in a locking direction; and
an operating spring elastically supporting the locker in the mirror housing and elastically moving the locker in the locking direction.

11. The rotatable sun visor mirror of claim 10, wherein the locker is movably installed to a mounting unit protruding from a lateral end of the mirror housing and has a leading end penetrating a through-hole of a lateral side of the mirror housing and inserted into a coupling recess formed in the mirror at the movement of the mirror in the locking direction.

12. The rotatable sun visor mirror of claim 11, wherein the locker comprises a manipulation unit formed at a side thereof, penetrating a manipulation hole formed in the mounting unit of the mirror housing, and positioned on an outer surface of the mirror housing.

13. The rotatable sun visor mirror of claim 3, wherein the guide unit comprises:
 a guide slot penetrating a lateral side of the cylindrical support first in a curves shape; and
 a guide protrusion protruding from the coupler coupled to an inner side of the support and guided along the guide slot in a state of being inserted into the guide slot.

\* \* \* \* \*